US012588982B2

(12) United States Patent
Ou et al.

(10) Patent No.: US 12,588,982 B2
(45) Date of Patent: Mar. 31, 2026

(54) FORMATION OF MONOLITHIC NANOSTRUCTURES ON PROSTHETIC DEVICES

(71) Applicant: DANMARKS TEKNISKE UNIVERSITET, Kongens Lyngby (DK)

(72) Inventors: Yiyu Ou, Kongens Lyngby (DK); Paul Michael Petersen, Kongens Lyngby (DK)

(73) Assignee: DANMARKS TEKNISKE UNIVERSITET, Congens Lyngby (DK)

( * ) Notice: Subject to any disclaimer, the term of this patent is extended or adjusted under 35 U.S.C. 154(b) by 603 days.

(21) Appl. No.: 17/926,926

(22) PCT Filed: May 27, 2021

(86) PCT No.: PCT/EP2021/064209
§ 371 (c)(1),
(2) Date: Nov. 21, 2022

(87) PCT Pub. No.: WO2021/239877
PCT Pub. Date: Dec. 2, 2021

(65) Prior Publication Data
US 2023/0200952 A1    Jun. 29, 2023

(30) Foreign Application Priority Data

May 27, 2020    (EP) .................................... 20176728

(51) Int. Cl.
*A61C 8/00* (2006.01)
*C23F 1/02* (2006.01)
*H01J 37/32* (2006.01)

(52) U.S. Cl.
CPC .............. *A61C 8/0037* (2013.01); *C23F 1/02* (2013.01); *A61C 2008/0046* (2013.01); *H01J 37/321* (2013.01); *H01J 2237/3341* (2013.01)

(58) Field of Classification Search
CPC .......... A61C 8/0037; A61C 2008/0046; A61C 8/0012; A61C 8/0013; C23F 1/02;
(Continued)

(56) References Cited

U.S. PATENT DOCUMENTS 6,652,765 B1    11/2003 Beaty
9,932,664 B2    4/2018 Beers et al.
(Continued)

FOREIGN PATENT DOCUMENTS

CN    101853868 A    10/2010
EP    3135242 A1    3/2017
(Continued)

OTHER PUBLICATIONS

Baena et al.: "Nanofeatured Titanium Surfaces for Dental Implantology: Biological Effects, Biocompatibility, and Safety", Journal of Nanomaterials, vol. 2017, art. ID 6092895, 18 pages, DOI: 10.1155/2017/6092895, Jun. 4, 2017.
(Continued)

*Primary Examiner* — Ricardo D Morales
(74) *Attorney, Agent, or Firm* — DINSMORE & SHOHL LLP

(57) ABSTRACT

A method for formation of monolithic nanostructures on an implantable device includes: a. depositing a metal film to a surface of the implantable device; b. heating the metal film for a period of time, such that the metal film transforms into multiple discrete nanoparticles, the multiple nanoparticles thereby forming an etch mask on the surface of the implantable device; c. etching the implantable device such that the surface of the implantable device is etched through the etch
(Continued)

mask, thereby forming monolithic nanostructures in the surface of the implantable device; and d. (optionally) removing the etch mask, such as by immersion in an aqua regia solution.

15 Claims, 7 Drawing Sheets

(58) Field of Classification Search
    CPC . H01J 37/321; H01J 2237/3341; C23C 16/06; C23C 16/56; A61L 2400/12; A61L 2400/18; A61L 2430/02; A61L 2430/12; A61L 27/06; A61L 27/56; A61L 27/50
    See application file for complete search history.

(56) References Cited

U.S. PATENT DOCUMENTS

| | | | |
|---|---|---|---|
| 10,182,887 B2 | 1/2019 | Mayfield et al. | |
| 2009/0220561 A1* | 9/2009 | Jin ......................... | A61L 27/56 435/402 |
| 2014/0329052 A1 | 11/2014 | Gittens Ibacache et al. | |

FOREIGN PATENT DOCUMENTS

| | | |
|---|---|---|
| WO | 2006116752 A2 | 11/2006 |
| WO | 2010022107 A2 | 2/2010 |
| WO | 2018187752 A1 | 10/2018 |

OTHER PUBLICATIONS

Liu et al.: "Atomic leyer deposition of nano-TiO2 thin films enhanced biocompatibility and antimicrobial activity for orthopedic implants", https://doi.org/10.2147/IJN.S148065, Dec. 8, 2017.

Maciej Domanski: "Nanofabrication Methods for improved bone implants", PhD thesis, University of Twente, the Netherlands, Sep. 2, 2011.

Nazarov et al.: Formation of Micro- and Nanostructures on the Nanotitanium Surface by Chemical Etching and Deposition of Titania Films by Atomic Layer Deposition (ALD), http://creativecommons.org/licenses/by/4.0/), Dec. 2, 2015.

Li et al.: "Balancing Bacteria-Osteoblast Competition through Selective Physical Puncture and Biofunctionalization of ZnO/Polydopamine/Arginine-Glycine-Aspartic Acid-Cysteine Nanorods", ACS Nano 2017, 11, 11250-11263, DOI: 10.1021/acsnano.7b05620, 2017.

* cited by examiner

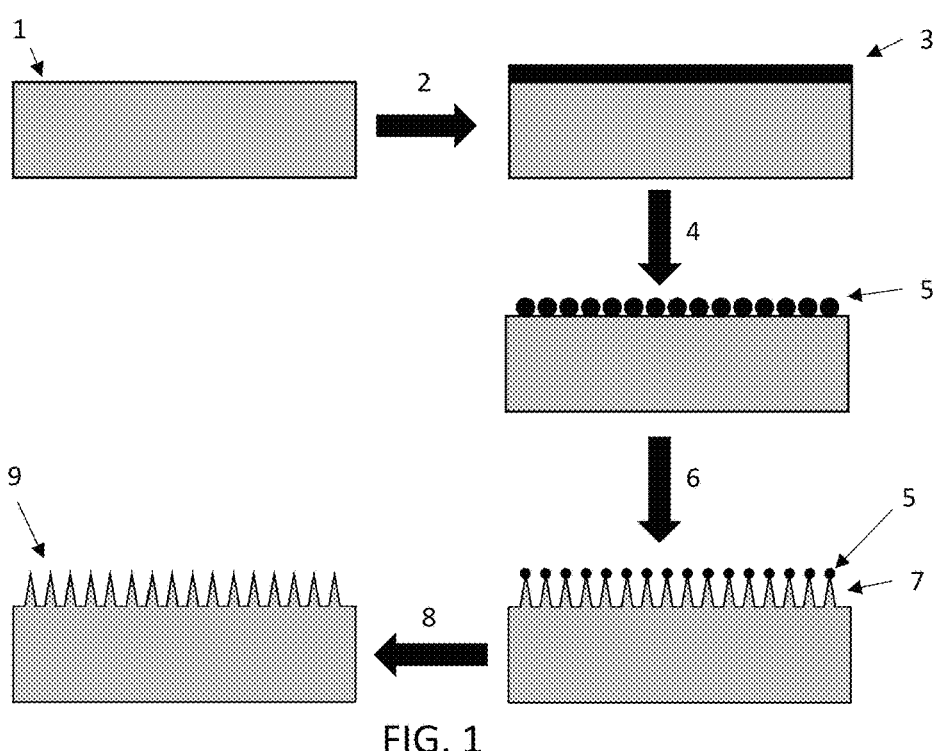
FIG. 1
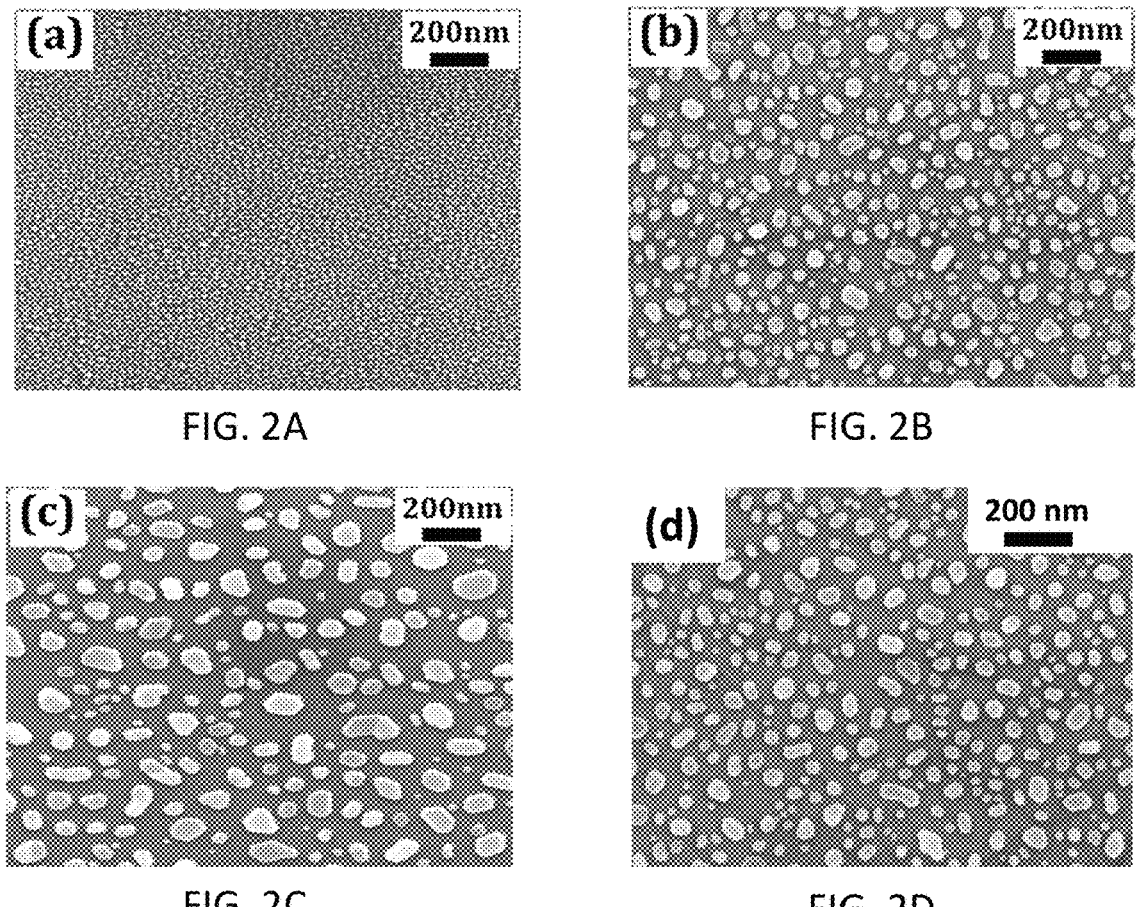
FIG. 2A                    FIG. 2B
FIG. 2C                    FIG. 2D Mask (77)
Target (78)
→ Etching of Mask (78)
⇢ Etching of Target (79)
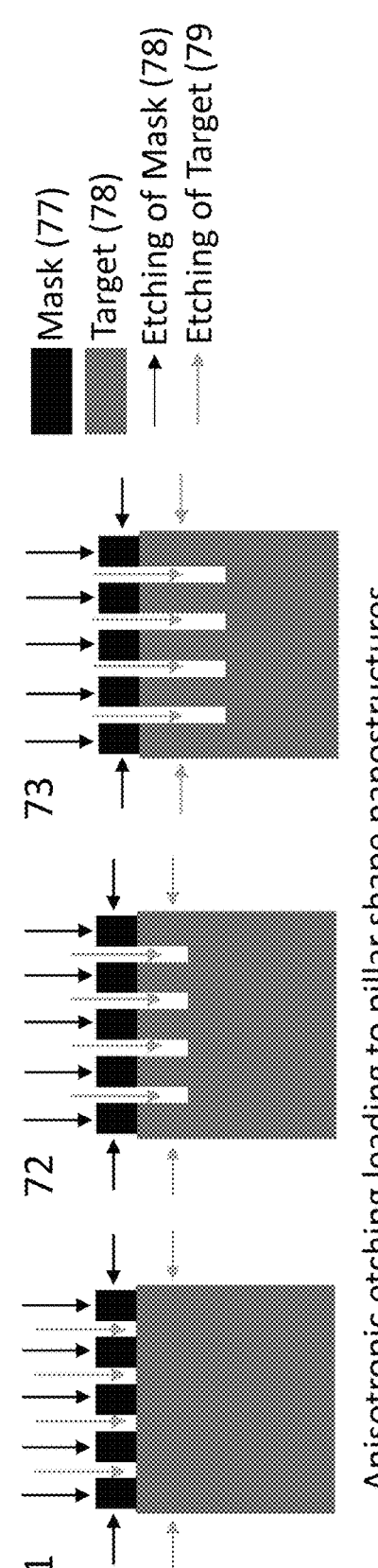
Anisotropic etching leading to pillar shape nanostructures
Time
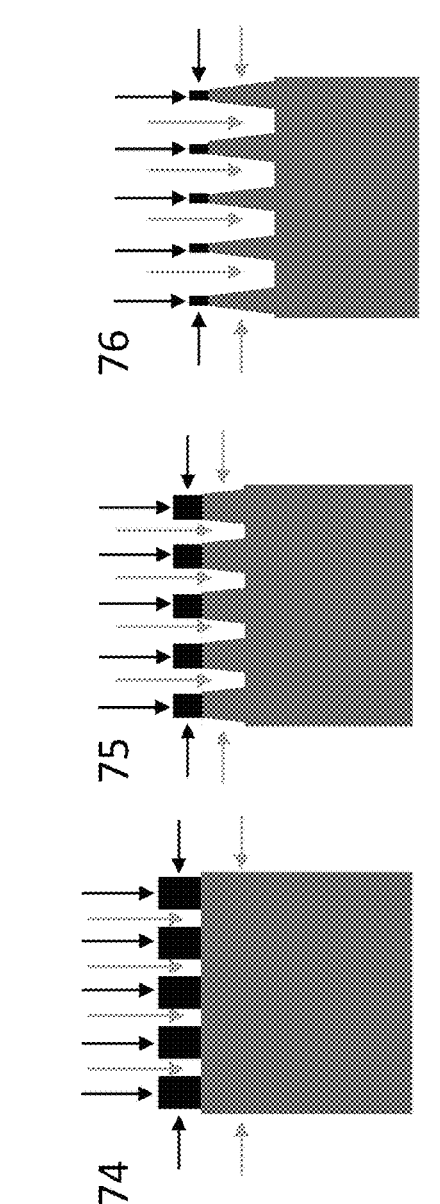
Isotropic etching leading to cone shape nanostructures
FIG. 7

FORMATION OF MONOLITHIC NANOSTRUCTURES ON PROSTHETIC DEVICES

CROSS-REFERENCE TO RELATED APPLICATIONS

This application is the U.S. National Stage of PCT/EP2021/064209 filed on May 27, 2021, which claims priority to European Patent Application 20176728.2 filed on May 27, 2020, the entire content of both are incorporated herein by reference in their entirety.

FIELD OF THE INVENTION

The present disclosure relates to a method for formation of monolithic nanostructures on prosthetic devices, and prosthetic devices comprising a surface with monolithic nanostructures.

BACKGROUND OF THE INVENTION

An implant is a medical device manufactured to replace a missing biological structure, support a damaged biological structure, or enhance an existing biological structure. Medical implants are man-made devices, in contrast to a transplant, which is a transplanted biomedical tissue. The surface of implants that contact the body might be made of a biomedical material such as titanium, silicone, or apatite depending on what is the most functional. In some cases, implants may contain electronics, for example in the cases of artificial pacemakers and cochlear implants.

Several types of medical implants exist, for example orthopedic implants, which are used to alleviate issues with the bones and joints of the body. They are typically used for treating bone fractures, osteoarthritis, scoliosis, spinal stenosis, and chronic pain. Examples include a wide variety of pins, rods, screws, and plates that may be anchored to the fractured bones while they heal.

Another example of an implant is a dental implant, which is a surgical component that interfaces with the bone of the jaw or skull to support a dental prosthesis such as a crown, bridge, denture, facial prosthesis or to act as an orthodontic anchor. Dental implants rely on a biologic process called osseointegration, in which materials such as titanium form an intimate bond to bone.

Implantation of a dental implant typically involves positioning the dental implant such that it is likely to osseointegrate. A variable amount of healing time is required for osseointegration before either the dental prosthetic (typically a tooth, a bridge or a denture) is attached to the implant or an abutment is placed which will hold the dental prosthetic.

A vast majority of dental implants are made of commercially pure titanium, due to its biocompatibility and mechanical properties. However, a significant challenge to medical implants in general, and specifically dental implants, is bacterial infections and the subsequent degradation of the implant.

In fact, it is estimated that 5% of all dental implants end in failure immediately after implantation, and about half of all dental implants suffer from bacterial infections. Therefore, for long-term implant success, a major challenge in implantology, and especially dental implantology, is to improve osseointegration of implants while simultaneously preventing bacterial infections.

Methods for increasing osseointegration or bacterial prevention of implants exist, and typically rely on mechanical, chemical or physical methods, for example plasma spray coating, or sandblasting and acid etching. The methods typically rely on roughening of the surface of the implant, thereby increasing the total surface area, which in turn facilitates an improved cell migration and attachment to the implant, enhancing the osseointegration process.

For bacterial prevention of implant surfaces, a common method is the use of zirconium, for example by blasting a titanium surface with zirconium oxide particles. This method has shown potential in decreasing bacterial adhesion to the implant surface, at least for some bacterial species. However, as the surface of such an implant comprises multiple elements, the long-term stability may be questionable and there may further be a risk of side-effects.

SUMMARY OF THE INVENTION

The present inventors have realized that implantable devices having a surface comprising monolithic nanostructures may lead to improved osseointegration and increased bacterial prevention.

Therefore, the present disclosure relates, in a first aspect, to a method for formation of monolithic nanostructures on an implantable device, the method comprising:

depositing a metal film to a surface of the implantable device;

heating the metal film for a period of time, such that the metal film transforms into multiple nanoparticles, the multiple nanoparticles thereby forming an etch mask on said surface of the implantable device;

etching the implantable device such that said surface of the implantable device is etched through the etch mask, thereby forming monolithic nanostructures in said surface of the implantable device; and (optionally) removing the etch mask.

Implantable devices are used in many different areas of the body, and may furthermore be used for different reasons, such as to support healing or to anchor a prosthesis. The most challenging environment for an implantable device may be the mouth, due to the oral microflora, which may comprise a wide number of bacterial species. The aggregate of microorganisms residing in the mouth may form a coating on teeth, known as dental plaque. However, if a dental implant is present in the mouth, the same bacteria may cause peri-implant diseases, including peri-implant mucositis, affecting the gum tissue around the dental implant, typically without bone loss, or peri-implantitis, comprising deterioration of the bone supporting the dental implant. While peri-implant mucositis is typically reversible, peri-implantitis requires surgical intervention. Thereby, the bacterial prevention properties of an implant device, and especially for a dental implant, is crucial for the long-term implant success.

It is therefore a preference that the nanostructures formed on the surface of the implantable device are configured for osseointegration and preventing bacterial growth. In an embodiment of the present disclosure, the nanostructures are therefore configured for decreased adhesion of bacteria typically related to peri-implantitis, such as *P. gingivalis, T. denticola*, and *F. nucleatum*. Preferably, the size of the monolithic nanostructures is smaller than the sizes of the bacteria. Thereby, it may be a preference that the average size of the nanostructures is smaller than 0.5 µm.

In addition to formation of nanostructures for improved osseointegration and bacterial prevention, the present disclosure further allows for formation of nanostructures also on non-planar surfaces. This makes the presently disclosed method highly suited for the formation of nanostructures on implant surfaces, for example dental implant surfaces, which are typically non-planar. The presently disclosed method does not rely on formation of thick oxide layers for processing of the implant surface, which is a common step in surface modification methods of prior art. Instead, the presently disclosed method may form monolithic nanostructures with advantageous properties, such as improved osseointegration and increased bacterial prevention as disclosed elsewhere herein, in the absence of an oxide layer or in the presence of only a naturally formed oxide layer (i.e. a native oxide layer, typically less than 10 nm in thickness).

Preferably, the metal film is deposited such that a surface of the implantable device is uniformly covered by a metal, such as gold, silver, aluminum, nickel or a combination thereof. The deposited metal film typically has a thickness between 1 nm and 25 nm, and may be deposited by any thin film deposition method, such as atomic layer deposition, e-beam deposition or sputtering.

By application of heat, during the heating step, dewetting of the metal film may occur such that the metal film is transformed into multiple nanoparticles. This step may comprise or consist of rapid thermal annealing of the metal film, wherein the metal film typically is subjected to a temperature between around 70° C. and 900° C. for at least 1 minute, such as at least 2 minutes.

The surface may be etched by any dry etching or wet etching process. Preferably, the surface of the implant device is etched through the etch mask that is formed by the nanoparticles. By adjusting properties of either the nanoparticles or the etching step, properties of the nanostructures may be tuned. The nanostructures may for example be tuned in terms of shape, height, tip width (tip apex diameter), sidewall angle, the spacing, apex diameter, surface density and aspect ratio. For an implant, such as a dental implant, said properties may be chosen for improved osseointegration and bacterial prevention.

The properties of the nanostructures that are determined by the configuration of the nanoparticles may include for example the density, the spacing and the tip width. The etching step may additionally determine a number of properties of the nanostructures. The etching step may comprise wet etching or dry etching. The typical isotropic and anisotropic natures of these methods may affect properties of the nanostructures.

The etching step may comprise dry etching wherein the exposed surface of the implantable device is subjected to a bombardment of ions for dislodging portions of the material from the exposed surface. Dry etching methods comprise inductive coupled plasma (ICP), reactive-ion etching (RIE), and ion beam etching (IBE), and are typically anisotropic. Alternatively, or additionally, the etching step may comprise wet etching wherein the exposed surface of the implantable device is subjected to an etching solution. Typically, wet etching is isotropic, however, this may depend on the etch solution.

In specific embodiments of the present disclosure it may be preferred to remove the etch mask by for example immersion of the etch mask in a suitable solution. The solution is preferably selected such that it selectively etches the nanoparticles, and may be for example an aqua regia solution, for etching of gold.

The present disclosure further relates to an implantable device comprising a surface with monolithic nanostructures for osseointegration and bacterial film prevention, formed by a method for formation of monolithic nanostructures on an implantable device, as disclosed elsewhere herein.

The present disclosure further relates to an implantable device comprising a surface with monolithic nanostructures for osseointegration and bacterial film prevention, wherein the nanostructures are:

substantially cone-shaped, with the base in contact with the substrate; or substantially ridge-shaped, formed between a number of substantially concave recesses of the surface.

Nanostructures which are substantially conical may be a result of anisotropic etching, typically dry etching. Similarly, ridge-shaped nanostructures may be a result of isotropic etching, typically wet etching.

BRIEF DESCRIPTION OF THE DRAWINGS

FIG. 1 shows an outline of a method for formation of monolithic nanostructures, according to an embodiment of the present disclosure;

FIG. 2 shows various types of nanoparticles, formed by heating of a deposited metal film, according to an embodiment of the present disclosure;

FIG. 7 shows a schematic illustration of the etching step, according to embodiment of the present disclosure.

DETAILED DESCRIPTION OF THE INVENTION

Definitions

Figure 3:
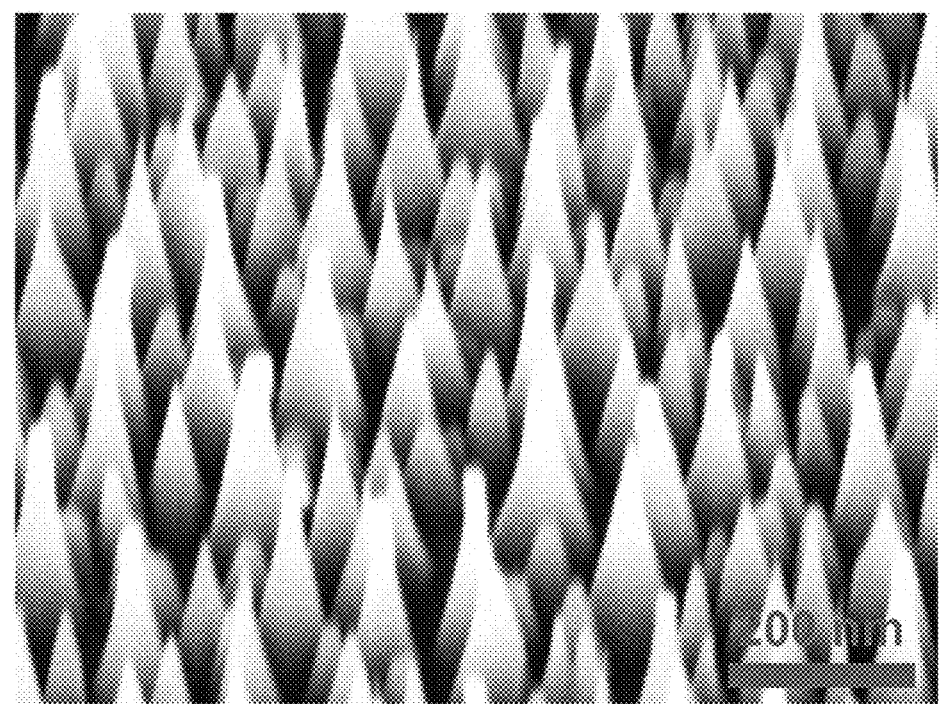
FIG. 3 shows conical monolithic nanostructures, according to an embodiment of the present disclosure.

Biocompatibility, as used herein, refers to the ability of a material, a device or a part of a device, to perform with an appropriate host response in a specific application.

Bacterial prevention, as used herein, refers to the decrease in bacterial adhesion and biofilm formation, of for example a structured surface, such as a nanostructured surface, as compared to a non-structured surface.

An implantable device as used herein refers to a medical device manufactured to replace a missing biological structure, support a damaged biological structure or a prosthesis, or enhance an existing biological structure. The surface of an implantable device that contacts the body might be made of a biomedical material such as titanium, silicone, or apatite depending on what is the most functional.

A dental implant, as used herein, refers to a medical device for interfacing with the bone of the jaw or skull to support a dental prosthesis such as a crown, bridge, denture, facial prosthesis or to act as an orthodontic anchor. A dental implant is a type of an implantable device.

Osseointegration, as used herein, refers to functional ankylosis, where new bone is laid down directly on the implant surface and the implant exhibits mechanical stability (i.e., resistance to destabilization by mechanical agitation or shear forces).

Vacuum as used herein refers to a pressure substantially below atmospheric pressure (760 Torr). Medium vacuum as used herein refers to a pressure between 25 and $10^{-3}$ Torr. High vacuum as used herein refers to a pressure between $10^{-3}$ and $10^{-9}$ Torr.

The present disclosure, in a first aspect, relates to a method for formation of nanostructures on an implantable device. The nanostructures are preferably monolithic, such as formed from a single substrate material. Preferably, said method comprises deposition of a thin layer, such as a metal film, to a surface of the implantable device. The surface may be a selected surface or a selected part of a selected surface of the implantable device. Typically, the surface is for functional ankylosis, such as for forming contact with new bone and/or gingival tissue. Deposition may be carried out by physical or chemical thin-film deposition, for formation of a thin film, preferably a metal thin film. The thickness of the film may be in the nanometers range, such as a few nanometers thick, preferably around about 1 nanometer to about 50 nanometers in thickness. The method preferably further comprises a heating step wherein heat is applied to said film and/or the surface such that said film transforms into nanoparticles. Said nanoparticles are preferably particles with an average size, such as the diameter, in the nanometer range. The heating step may comprise rapid thermal processing, such as rapid thermal annealing. Preferably, the surface of the implantable device is etched by an etch mask comprising the nanoparticles. The surface may thereby be etched through said etch mask such that nanostructures are formed. The nanoparticles are preferably distanced such that the surface may be etched through the etch mask. Etching of the implantable device may comprise or consist of anisotropic and/or isotropic etching. Typically, wet etching results in isotropic etching while dry etching results in anisotropic etching. Thereby, the final characteristics of the nanostructures are affected by the choice of etching method. Anisotropic etching may produce cone-shaped nanostructures while isotropic etching may produce ridge-shaped structures. It is a preference that the nanostructures are formed in the surface of the implantable device, such as the negative space between the nanostructures may thereby be the location where the etching step has removed material from the implantable device. In specific embodiments of the present disclosure, such as wherein at least parts of the nanoparticles remain on the surface of the implantable device following the etching step, it may be a preference to remove the etch mask. The etching mask may for example be removed by immersion in a suitable solution, such as an aqua regia solution. In other embodiments of the present disclosure, such as wherein the nanoparticles are substantially or completely etched by the etching step, the step of removal of the etching mask may not be preferred. Preferably, the nanostructures facilitate osseointegration and an antimicrobial effect.

Implant Material

In one embodiment of the present disclosure, the material of the implantable device (e.g. the entire implantable device or a surface of the implantable device, preferably at least a part where the presently disclosed monolithic nanostructures are to be formed) is biocompatible, resistant to corrosion and/or resistant to fracturing. The material of the implantable device (e.g. the entire implantable device or a surface of the implantable device) may for example comprise or consist of a metal or a ceramic. The material of the implantable device may for example be titanium, zirconium, zirconia (zirconium dioxide) or an alloy thereof. Preferably the alloy comprises titanium at a quantity sufficient for formation of titanium oxide, such as on the surface, preferably more than 85% titanium. Alternatively, the material of the implantable device may be a polymer, such as polyethylene, for example molecular-weight polyethylene (UHMWPE) or cross-linked polyethylene (XLPE). Pure titanium is generally a preferred material for implantable devices, such as dental implants, because of its excellent biocompatibility and mechanical properties. The biocompatibility of titanium implants is generally credited to the formation of a stable oxide layer on its surface. The natural oxide layer of titanium is typically below 10 nm in thickness, for example between 4-6 nm, and thereby typically differs significantly from chemically modified titanium surfaces, where the thickness of the oxide layer has been increased. Certain processes of the prior art may rely on formation of oxide layers of a certain thickness, for example at least 100 nm, in order to structures with desired properties, for example trenches with sidewalls having a specific sidewall angle. Unlike this, the presently disclosed method does not rely on the formation of thick oxide layers, i.e. oxide layers thicker than the naturally formed oxide (typically below 10 nm, more typically below 20 nm). Various zirconia materials are known to a skilled person, for example in Apratim et al., J. Int. Soc. Prev. Community Dent. 2015 May-June; 5(3): 147-156.

Commercially pure titanium (cpTi) is classified into 4 grades, which differ in their oxygen content. Grade 4 typically has the most (around 0.4%) and grade 1 the least (around 0.18%) oxygen content. The mechanical differences that exist between the different grades of cpTi is primarily due to contaminants present in minute quantities. Iron is added for corrosion resistance and aluminum is added for increased strength and decreased density, while vanadium acts as an aluminum scavenger to prevent corrosion. Hexagonal close-packed crystal lattice of Ti is called the $\alpha$-Ti ($\alpha$-phase) while the body-centered cubic lattice is called the or $\beta$-phase. There is a transformation from $\alpha$-phase to $\beta$-phase on heating over 883° C. Similarly, the crystal forms of polymorph zirconium are monoclinic, cubic and tetragonal. The phases may be stabilized by CaO, MgO and Y2O3, which may result in multi-phased partially stabilized zirconia (PSZ). In a preferred embodiment of the present disclosure, the material of the implantable device comprises or consists of grade 4 titanium and/or grade 5 titanium.

Titanium has a number of properties that makes it suitable for an implant device, such as biocompatibility, high passivity, controlled thickness, rapid formation, ability to repair itself instantaneously if damaged, resistance to chemical attack, catalytic activity for a number of chemical reactions, and modulus of elasticity compatible with that of bone.

Titanium zirconium alloys may have improved mechanical attributes, such as increased elongation and fatigue strength, as compared to pure titanium. A common alloy of titanium and zirconium is Straumann Roxolid comprising 13-17% zirconium.

In an embodiment of the present disclosure, the implantable device is a dental implant. The implantable device may thereby be a surgical component that interfaces with the bone of the jaw or skull to support a dental prosthesis such as a crown, bridge, denture, facial prosthesis or to act as an orthodontic anchor. For example an abutment may be attached to the dental implant, and thereafter hold a dental prosthesis. For example in a single tooth implant restoration. Alternatively the dental implant may be used for an implant retained fixed bridge, wherein typically multiple dental implants are attached to the bone and support a dental bridge.

Bacteria

Bacterial infection at an implantation site is a significant problem for a successful implantation, and potentially the most challenging environment for an implantable device may be the mouth, due to the oral microflora, which may comprise a wide number of bacterial species. The aggregate of microorganisms residing in the mouth may form a coating on teeth, known as dental plaque. However, if a dental implant is present in the mouth, the same bacteria may cause peri-implant diseases, including peri-implant mucositis, affecting the gum tissue around the dental implant, typically without bone loss, or peri-implantitis, comprising deterioration of the bone supporting the dental implant. While peri-implant mucositis is typically reversible, peri-implantitis requires surgical intervention. Thereby, the bacterial prevention properties of an implant device, and especially for a dental implant, is crucial for the long-term implant success.

It is therefore a preference that the nanostructures formed on the surface of the implantable device are configured for preventing bacterial growth and preferably such that osseointegration is increased while simultaneously preventing bacterial growth. In an embodiment of the present disclosure, the nanostructures are therefore configured for decreased adhesion of the bacteria typically related to peri-implantitis, such as *P. gingivalis, T. denticola*, and *F. nucleatum*. Preferably, the size of the monolithic nanostructures is smaller than the sizes of the bacteria. Thereby, it may be a preference that the average size, such as the average tip width, the average distance between nanostructure, and/or the average height of the nanostructures, is smaller than 0.5 μm. Typical sizes of common bacteria related to peri-implantitis is given in Table 1.

TABLE 1

| common sizes of typical bacteria related to peri-implantitis. | |
|---|---|
| Species | Dimensions (μm) |
| P. Gingivalis | 0.5 by 2 |
| T. Denticola | 0.5 by 3-20 |
| F. Nucleatum | 0.4-0.7 by 3-10 |

The implantable device may be any type of implant, preferably an implantable device wherein osseointegration and/or bacterial prevention is desired. The implantable device may for example be an orthopedic implant. In an embodiment of the present disclosure the implantable device is, or is a part of, a hip prosthesis, a knee prosthesis, a trauma nail, a knee implant, a lag screw, a spinal cage, a glenoid implant, an ankle fusion implant, a foot/toe implant, a long bone osteotomy plate or bone implant, a sacroiliac joint implant, a cranial plate, and/or a maxillofacial plate.

Size of Nanostructure

The nanostructures may be configured for bacterial lysis, wherein bacteria is exposed to a topography that generates a sufficiently high local stress across the bacterial cell wall. Thereby, the nanostructure may be configured for a contact point between the bacterial cell wall on the surface of the nanostructure, which is much smaller than the bacteria. Preferably, the contact points between the nanostructures and the bacteria are distanced sufficiently far apart in order to allow for a sufficiently high local stress for bacterial lysis.

Thereby it may be a preference that the apex diameter (also referred to as tip width), such as the tip of the nanostructure, or the tip width (tip apex diameter), is smaller than half the size of the bacteria, such as smaller than half the longest dimension of the bacteria. Preferably, the tip width is on average smaller than 0.25 μm, or that the spacing, such as the surface between the walls of the nanostructures on average has a size of less than 0.5 μm. For nanostructures according to specific embodiments of the present disclosure, the nanostructures may not be concentric, in such instances it may be more correct to refer to the above-mentioned stress-inducing surface as an tip width, in such instances, the tip width/apex diameter typically refers to the lowest tip width of the non-concentric shaped nanostructure. While it is a preference that the tip width is smaller than half the longest dimension of a relevant bacteria, e.g. the tip width is typically preferably lower than 0.5 μm, the method of the present disclosure may realize nanostructures with higher antibacterial properties by having a smaller apex diameter. Therefore, it is a preference that the tip width of the nanostructures is below 0.5 μm, more preferably below 50 nm, yet more preferably below 20 nm, even yet more preferably below 10 nm, most preferably below 7 nm.

In an embodiment of the present disclosure, the tip width of the nanostructures is below 30, more preferably below 20 nm, yet more preferably below 10 nm, most preferably below 6 nm.

In an embodiment of the present disclosure, the formation of nanostructures on the surface comprises a deposition step, a heating step, an etching step and preferably an etch mask removal step. Table 2 outlines typical parameters of the method. The material of the metal film is exemplified by gold, silver, aluminum and nickel.

TABLE 2

| processing parameters for nanoparticle formation | | | | |
|---|---|---|---|---|
| Material | Thickness (nm) | Temperature (° C.) | Pressure (mTorr) | Annealing time(min) |
| Au | 1-12 | 300-700 | <100 | >2 |
| Ag | 1-20 | 200-350 | <100 | >2 |
| Al | 5-25 | 70-350 | <100 | >1 |
| Ni | 1-20 | 700-900 | <100 | >2 |

Deposition

It is a preference that the material of the metal film is selected such that, upon application of heat, such as by rapid thermal annealing, nanoparticles may be formed on a surface. In specific embodiments of the present disclosure, the material of the metal film is selected such that it is at least partially etched in the etching step. In one embodiment of the present disclosure, the material of the metal film is selected from the group of: gold, silver, aluminum, nickel, an alloy thereof, or a combination thereof. Preferably, the metal film is deposited such that a surface of the implantable device is uniformly covered by a metal, such as gold, silver, aluminum, nickel or a combination thereof. It is a further preference that the deposited metal film has a thickness in the nanometer range. A thicker metal film may enable the formation of larger nanoparticles upon the application of heat. Therefore, it is a preference that the thickness of the metal film is between 1 nanometers and 50 nanometers, more preferably between 1 nanometers and 25 nanometers. Thereby, the metal film may be considered a thin-film and deposition may be performed by a thin-film deposition method. Therefore, the deposition comprises or consists of a method for creating and/or depositing thin film coatings onto a substrate material, such as a surface of an implantable device.

Deposition may thereby comprise a method suitable for formation of a thin film, such as physical deposition, chemical deposition and/or epitaxy. Physical deposition comprises physical vapor deposition (PVD) wherein a solid material is vaporized in a vacuum, and deposited onto a substrate. Various physical vapor deposition methods exist, and include for example evaporation methods, such as E-beam evaporation, Ion-assisted deposition, and thermal evaporation. Physical vapor deposition methods further comprises magnetron sputtering, relying on the formation of magnetically confined plasma near the surface of the target, e.g. a surface of an implantable device, ion beam sputtering, relying on an ion source to sputter the target material onto the substrate, and further pulsed laser deposition, relying on laser pulses to evaporate the target material. Another category of thin film deposition is chemical deposition wherein a fluid precursor undergoes a chemical change at a solid surface, leaving a solid layer. Chemical deposition methods comprise atomic layer deposition (ALD) relying on the use of gas-phase precursors to deposit conformal thin films one layer at a time. Preferably, the deposition method allows for deposition of metal films on planar and/or non-planar surfaces.

The deposition rate is typically not important for the end result. However, in specific situations one may want to assert more control over the deposition process. For example in cases where the process is monitored in real time. For example, in these cases, and others, it may be advantageous to deposit the metal at a rate between 0.1 Å/s and 10 Å/s, more preferably between 0.3 Å/s and 7 Å/s, most preferably around 1 Å/s.

Heating

The formation of nanostructure may comprise application of heat to a metal film, such that said film is transformed into nanoparticles. The heating step may comprise or consist of rapid thermal processing, such as rapid thermal annealing, of the metal film. In an embodiment of the present disclosure the metal film is subjected to a temperature between around 70° C. and 900° C., preferably between 300° C. and 700° C. Heating of the metal film is preferably performed until the metal film has transformed into nanoparticles, preferably fully transformed into nanoparticles. The metal film may be heated for at least 1 minute, such as at least 2 minutes. Preferably the metal film is heated for at least 1 minute, such as at least 2 minutes.

By application of heat, dewetting of the metal film may occur such that the metal film is transformed into multiple nanoparticles. Thereby, the agglomeration of the metal film may be driven by an increase in the surface energy of the metal film during heating. When the surface energy of the metal film is bigger than the sum of the surface energy of the implant and the interfacial energy between the two layers, the film may begin to agglomerate, thereby forming nanoparticles, with a minimum energy state and a uniform contact angle.

Various conditions are suitable for application of heat to a metal film such that said metal film transforms into nanoparticles. However, it may be preferably under specific circumstances that the heating is performed in an inert atmosphere, such as a nitrogen atmosphere. Furthermore, in a further embodiment of the present disclosure, heating is performed below atmospheric pressure, preferably medium vacuum or higher, more preferably high vacuum or higher. In a preferred embodiment of the present disclosure, the application of heat, e.g. rapid thermal annealing, is carried out at a pressure lower than 100 mTorr.

Nanoparticles

As discussed elsewhere herein, parameters such as the thickness of the metal film, the heating conditions, and the material of the metal film and the surface affect the resulting properties and characteristics of the nanoparticles. The large tunability of the presently disclosed method allows for formation of nanoparticles having specific desired properties. For example, in an embodiment of the present disclosure, the density, the number (quantity) per unit area, of the nanoparticles is between 1 $\mu m^{-2}$ and 2000 $\mu m^{-2}$, more preferably between 1.7 and 1950 $\mu m^{-2}$. The tuning of the properties of the nanoparticles, such as the size, the density, and the shape, thereby allows for the formation of an etch mask having desired properties. It is a preference that the configuration of the etch mask is such that a subsequent etching allows for formation of nanostructures for improved osseointegration and bacterial prevention. For example, it is a preference that the nanoparticles are distanced sufficiently apart such that an etching solution can etch the surface through the etch mask. It should be noted that the pattern of the nanoparticles, on the surface, is typically replicated as the pattern of the nanostructures, which may be due to how the nanoparticles shield parts of the surface from the etching. Typically, the material of the nanoparticles is identical to the material of the metal film, however chemical processes may act to modify the material, such as oxidizing the material during transformation of the metal film to nanoparticles.

The size variability of the nanoparticles may be controlled by tuning the processing parameters, for example the time of the heating step. In an embodiment of the present disclosure, the nanoparticles have a low size variation, such that similar sized nanostructures may be formed. The coefficient of variation of the nanoparticles is preferably less than 50%. Coefficient of variation as used herein refers to the standard deviation divided by the mean. Thereby, the size, such as the diameter, preferably the diameter of the projection, perpendicular to the surface, of the nanoparticles on the surface, has a coefficient of less than 50%. The diameter of the nanoparticles are preferably defined as the average of the largest and smallest dimension of an elliptical fit, in an image acquired perpendicular to the surface. Therefore, the diameter may be assessed also for non-spherical nanoparticles. In an embodiment of the present disclosure, the average diameter of the nanoparticles is between 10 nm and 350 nm. Preferably the d90 size value (the diameter) of the nanoparticles is between 10 nm and 350 nm. As mentioned above, the mean size of the nanoparticles depends on the thickness of the deposited metal film, as further can be seen in the table below listing the measured mean size and standard deviation following rapid thermal annealing of metal (gold) films on titanium surfaces of different thicknesses.

| Deposited Au film thickness (nm) | Mean size of formed Au nanoparticles (nm) | Standard deviation (nm) |
|---|---|---|
| 3 | 16 | 6 |
| 5 | 43 | 18 |
| 7 | 63 | 29 |
| 9 | 126 | 47 |
| 11 | 231 | 64 |
| 13 | 316 | 138 |

Etching

In an embodiment of the present disclosure, the etching step comprises etching of the surface by an isotropic and/or an anisotropic etch method. Preferably, the surface of the implant device is etched through the etch mask, such as formed by the nanoparticles, for formation of monolithic nanostructures. The configuration of the nanoparticles in combination with the configuration of the etching step may determine the configuration of the resulting nanostructures. By adjusting properties of either the nanoparticles or the etching step, properties of the nanostructures may be tuned. Nanostructures may for example be tuned in terms of shape, height, tip width, sidewall angle, the spacing, apex diameter, surface density and aspect ratio. For an implant, such as a dental implant, said properties may be chosen such that the osseointegration and bacterial prevention of the implantable device are maximized.

In many embodiments of the present disclosure, the etching properties of the etch method will have a significant impact on the resulting (monolithic) nanostructures. In fact, in specific embodiments of the present disclosure, the etching step may be configured such that the etch mask (e.g. the nanoparticles of the etch mask) and the surface of the implantable device are etched differently, for example different directionalities and/or etch rates. In specific embodiments of the present disclosure, the etching step may be arranged such that the etch rate of the mask material (i.e. the material of the nanoparticles, e.g. gold) is lower than the material of the implantable device (e.g. the material of the surface of the implantable device where the nanostructures are to be formed), preferably at least in the lateral direction (i.e. parallel with the surface of the implantable device), such conditions typically produce nanostructures in the shape of vertical pillars.

In a preferred embodiment of the present disclosure the etching rate of the mask material is between 0.01 and 1 times the etching rate of the target material, more preferably between 0.02 and 0.8 times the etching rate of the target material, yet more preferably between 0.05 and 0.5 times the etching rate of the target material.

In an embodiment of the present disclosure the etching rate of the target material is around 100 nm/min and the etching rate of the mask material is between 1 nm/min and 100 nm/min, more preferably between 5 nm/min and 50 nm/min, yet more preferably between 10 nm/min and 50 nm/min, most preferably between 20 nm/min and 40 nm/min.

In an embodiment of the present disclosure the etching rate of the target material is in the range of between 1 nm/min to 2000 nm/min, preferably between 20 nm/min and 200 nm/min.

In order to assert high control of the etching it is typically desired that the etch rate is selected such that the nanostructures are formed in between 2-15 minutes, more preferably between 4-10 minutes. For example, for nanostructures with a height of 200 nm, an etch rate of 20-50 nm/min may be preferred for high control over the etching step. Similarly, for nanostructures with a height of 1000 nm, an etch rate of 100-200 nm/min may be preferred for high control over the etching step.

The properties determined by the nanoparticles may include for example the density, the spacing and the tip width. Additionally, the etching step may determine a number of properties of the nanostructures. The etching step may comprise wet etching or dry etching. The typical isotropic and anisotropic natures of these methods may affect properties of the nanostructures of the surface of the implantable device.

In an embodiment of the present disclosure, the etching step comprises or consists of wet etching. Said wet etching may comprise subjecting a part of the surface to an etching solution. Wet etching is typically substantially anisotropic, such as anisotropic. Some wet etchants etch crystalline materials at very different rates depending upon which crystal face is exposed. In single-crystal materials, this effect can result in very high anisotropy. Preferably, the etch mask shields a part of the surface from the etching solution, for formation of nanostructures by etching. The etching solution may comprise or consist of a hydrofluoric acid (HF) solution, a nitric acid ($HNO_3$) solution, an ammonium hydroxide solution, a hydrogen peroxide ($H_2O_2$) solution, or a mixture thereof, such as an aqueous hydrofluoric acid and hydrogen peroxide solution. In a preferred embodiment the etching solution comprises hydrofluoric acid, nitric acid and hydrogen peroxide. In an equally preferred embodiment of the present disclosure, the etching solution comprises hydrogen peroxide and ammonium hydroxide. Preferably the etching solution is a buffered solution. Preferably, the etching solution is a solution capable of etching the material of the surface of the implantable device and/or the nanoparticles. Preferably, the etching solution is selected to have a higher etching rate for the surface of the implantable device than for the nanoparticles.

In an embodiment of the present disclosure, the etching step comprises or consists of dry etching. Said dry etching may comprise subjecting the exposed surface of the implantable device to a bombardment of reactive species for dislodging portions of the material from the exposed surface. Dry etching methods are typically substantially anisotropic, such as anisotropic, and comprise inductive coupled plasma (ICP), reactive-ion etching (RIE), and ion beam etching (IBE). Dry etching may also be referred to as plasma etching and may comprise microwave plasma etching and hydrogen plasma etching. In an embodiment of the present disclosure, the source gas is $Cl_2$, Ar, $CF_4/SF_6$, and $O_2$ or a mixture thereof. Following etching, it may in specific embodiments be a preference that the etch mask is removed. For example by immersion in a solution that selectively etches the etch mask, such as an aqua regia solution. Removal of the etch mask may however comprise any suitable method for removal of the etch mask, such as the nanoparticles. Removal of the etch mask may be carried out by a physical process or chemical process, such as dry etching or wet etching. Preferably, the removal of the etch mask is selective for etching of the etch mask. For example, the use of an aqua regia solution may preferably etch gold nanoparticles, over other surfaces of the implantable device. Thereby, in one embodiment of the present disclosure, removal of etching mask is done by immersion in an etching solution, preferably a selective etching solution, such as aqua regia for gold particles. The method is highly versatile in that multiple properties of the final nanostructures can be tuned by for example the thickness of the metal film, the material of the metal film, the heating conditions, the etching solution, and the etching time. Another solution that may be used to remove the mask material (e.g. the nanoparticles) include an iodine based solution, such as $KI:I_2:H_2O$ with a ratio of 100 g:25 g:500 ml.

In an embodiment of the present disclosure the sidewall angle of the nanostructures is, on average, between 18° and 90° (where 90° refers to vertical sidewalls). Thereby, the nanostructures may be cone-shaped, substantially pillar-shaped, and/or ridge-shaped. The sidewall angle may be determined to a significant degree by the configuration of the etching step, such as the processing parameters. Substantially pillar-shaped structures may be the result of a substantially anisotropic etching process, for example reactive ion etching. In such a process the bombardment by the accelerated ions may lead to a directional, typically vertical or at least substantially vertical, etching of the substrate and/or the nanoparticles. The degree of etching of the nanoparticles may be reflected in the sidewall angle. For example, an anisotropic etching process configured such that the nanoparticles are minimally etched typically results in substantially 90° sidewalls of the formed nanostructures. On the other hand, an anisotropic etching process configured such that the nanoparticles are substantially etched, the sidewall angle of the formed nanostructures is typically substantially below 90°, for example below 70°, or even below 50°, or yet even below 30°. Thereby, the degree of etching of the nanoparticles typically influences the sidewall angle of the nanostructures. In a preferred embodiment of the present disclosure, the sidewall angle is between 18° and 90°, more preferably between 18° and 85°, yet more preferably between 25° and 75°, leading to high antimicrobial properties of the formed nanostructures. It is typically important to have a relatively sharp tip of the nanostructures. Consequently nanostructures with a sidewall angle of 90° is typically less preferred. Instead nanostructures, such as cone and/or ridge-shaped, with a sidewall angle below 90° is preferred, such as between 18° and 85°. The etching process may be configured to achieve the desired sidewall angle of the nanostructures, such as a sidewall angle providing the implant surface with optimized bacterial prevention and osseointegration properties. Furthermore, etching processes such as dry etching, e.g. RIE and ICP, is typically a combination of isotropic and anisotropic etching, e.g. physical and chemical etching. The etching of the nanoparticles may be influenced by the degree of chemical etching. A larger degree of chemical etching may also result in a larger degree of lateral etching of the nanoparticles. The lateral etching of the nanostructures may thereby modify the etching mask such that a larger part of the substrate is exposed by the etching mask. Gradually smaller nanoparticles during the etching step may result in conical nanostructures. Furthermore, the rate of etching of the nanoparticles, such as the rate of lateral etching of the nanoparticles, in relation to the rate of etching of the surface of the implantable device, typically affects the sidewall angle of the nanostructures. A higher ratio, during the etching step, between the rate of etching of the surface of the implantable device and the rate of etching of the nanoparticles typically results in a higher sidewall angle of the nanostructures (i.e. for instances where the nanoparticles are substantially intact following etching, or at least where the coverage of the nanoparticles are substantially intact following etching, the sidewall angle is high, for example) 90°. Similarly, a lower ratio, during the etching step, between the rate of etching of the surface of the implantable device and the rate of etching of the nanoparticles typically results in a lower sidewall angle of the nanostructures. The rate of etching of the nanoparticles may be affected by the etching configuration, and may comprise processing parameters such as gas sources and chamber pressure.

Samples exposed to dry etching typically result in cone-shaped or pillar shaped nanostructures. The dry etching process consists of two parts: physical etching (accelerated ion bombardment) and chemical etching (plasma of reactive gases in the etching chamber). The physical etching works in one direction and gives an anisotropic etching profile. The chemical etching works in all directions and gives an isotropic etching profile. The final etching profile is a combination of both, as shown in FIG. 7 and further described below.

When the overall etching has a low etching rate on mask material (e.g. the nanoparticles) in the lateral direction, the size of the mask material will not decrease very much in the process and this will lead to a pillar shaped nanostructure of the target material. In contrast, when the overall etching has a high etching rate on mask material in the lateral direction, the size of the mask material will decrease and the size of exposed area will increase in the process. This will lead to a cone shaped nanostructure of the target material. For antimicrobial properties of the surface of the implantable device, cone shaped nanostructures are preferred.

The size of the etched nanostructures is determined by the sizes of the mask material (i.e. the sizes of the nanoparticles and the distance there between). The height of the etched nanostructure is determined by the applied etching time. A longer etching time leads to the structure with an increased height. An example SEM image of dry etched Titanium nanostructure is shown in FIG. 3.

Figure 4A:
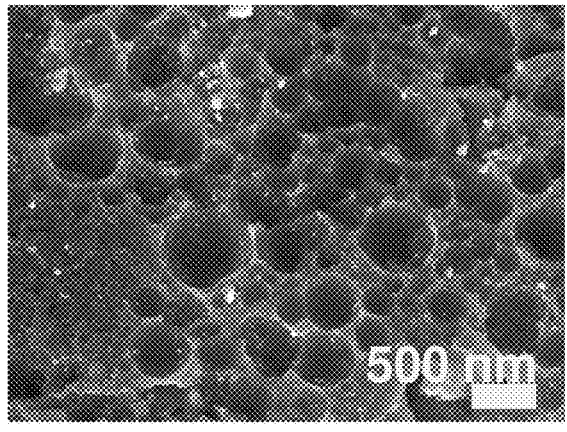
FIG. 4 shows ridge-shaped monolithic nanostructures, formed between a number of substantially concave indentations of the surface, according to an embodiment of the present disclosure.

The wet etched sample presents a stochastic shape due to the isotropic etching profile of the wet etching method. The height of the etched structure is determined by the applied etching time. Similar to dry etching, the overall etching profile of a wet etching process is a combined effect of etching on mask material and target material, in both lateral and vertical directions. Factors including types of etchant, concentration of each etchant, etching temperature, choice of mask material, etc. will affect the final etching profile. By modifying these factors nanostructures of different shapes may be formed including ridge-shaped nanostructures, such as formed between a number of substantially concave indentations, and cone-shaped nanostructures. An example SEM image of wet etched Titanium nanostructure with indentation shape is shown in FIG. 4A. An example SEM image of wet etched Titanium nanostructure with cone shape of high aspect ratio is shown in FIG. 4. An example SEM image of wet etched Titanium nanostructure with cone shape of low aspect ratio is shown in FIG. 5B.

Nanostructures

The nanostructures are preferably formed on the surface of the implantable device, such that they on average have an orientation perpendicular to the surface. The density of the nanostructures are typically similar to the density of the nanoparticles, and may range between 1 $\mu m^{-2}$ and 2000 $\mu m^{-2}$. It may be a preference that the average spacing between the nanostructures is smaller than the smallest dimension of the bacteria related to peri-implantitis. Therefore, in a further embodiment of the present disclosure, the average distance between two neighboring nanostructures, such as the average distance between the tips of two neighboring nanostructures, is, on average, 10 nm and 300 nm. Furthermore, the height of the nanostructures, i.e. the distance from the plane of the surface, perpendicular to the surface, to the tip of the nanostructure, is preferably below the size, such as the smallest dimension, of bacteria related to peri-implantitis. Therefore, in a further embodiment of the present disclosure, the average height of the nanostructures is between 50 nm and 500 nm. In yet an embodiment of the present disclosure, the average height of the nanostructures is between 10 nm and 500 nm, more preferably between 20 nm and 400 nm, yet more preferably between 30 nm and 300 nm, most preferably between 35 nm and 100 nm.

In yet another embodiment of the present disclosure, the average aspect ratio of the nanostructures is between 0.14 and 50. The aspect ratio as used herein refers to the height of the nanostructures, such as from the base to the tip, divided by the width of the nanostructures, such as base width of the nanostructures. The nanostructures may thereby be high aspect ratio nanostructures. In a further embodiment of the present disclosure, the tip of the nanostructures has a curvature, said curvature may be described by a tip width (tip apex diameter). It may be a preference that the tip width (tip apex diameter) is between 10 nm and 350 nm. In a further embodiment of the present disclosure, the tip width of the nanostructure is below 0.5 μm. Thereby, it may be a preference that the tip width is below the size of the bacteria related to peri-implantitis. The nanostructures may be substantially vertical, i.e. perpendicular to the surface, alternatively, the nanostructures may on average have a sidewall angle below 90°. In an embodiment of the present disclosure, the sidewall angle is between 18° and 90°. The nanostructures may thereby be substantially cone-shaped, such as extending from the surface of the implantable device.

In an embodiment of the present disclosure the base width of the nanostructures is below 1 μm, more preferably below 600 nm, yet more preferably below 400 nm, even yet more preferably below 200 nm, once yet more preferably below 10 nm, even once yet more preferably below 50 nm, even once yet more preferably below 10 nm.

The present disclosure further relates to an implantable device comprising a surface with monolithic nanostructures for osseointegration and bacterial film prevention, formed by a method for formation of monolithic nanostructures as disclosed elsewhere herein.

The present disclosure further relates to an implantable device comprising a surface with nanostructures, for osseointegration and bacterial film prevention. It is a preference that the nanostructures are monolithic, such as that they are formed by removal of material from a surface of an implantable device, that they are formed in the same material as the implantable device. The implantable device may have nanostructures which are substantially conical, extending from the surface of the implantable device. Preferably, the nanostructures extend substantially outwards, from the surface of the implantable device, such as substantially perpendicular to a surface of the implantable device that the nanostructure is in contact with. It may further be a preference that the circumference and/or the width of the nanostructure decreases outwardly from the substrate, such as that the nanostructure has a tip at the end. In another embodiment of the present disclosure, the sidewalls of the nanostructure are substantially vertical sidewalls, such as vertical. Thereby, the nanostructure may further substantially be pillar-shaped. In another embodiment of the present disclosure, the nanostructure is ridge-shaped. It is a preference that the ridge shaped nanostructures are formed between a number of substantially concave indentations of the surface.

The nanostructures are preferably formed on the surface of the implantable device, such that they on average have an orientation perpendicular to the surface. The density of the nanostructures are typically similar to the density of the nanoparticles, and may range between 1 μm$^{-2}$ and 2000 μm$^{-2}$. It may be a preference that the average spacing between the nanostructures is smaller than the smallest dimension of the bacteria related to peri-implantitis. Therefore, in a further embodiment of the present disclosure, the average distance between two neighboring nanostructures, such as the average distance between the tips of two neighboring nanostructures, is, on average, 10 nm and 300 nm. Furthermore, the height of the nanostructures, i.e. the distance from the plane of the surface, perpendicular to the surface, to the tip of the nanostructure, is preferably below the size, such as the smallest dimension, of bacteria related to peri-implantitis. Therefore, in a further embodiment of the present disclosure, the average height of the nanostructures is between 50 nm and 500 nm.

In yet another embodiment of the present disclosure, the average aspect ratio of the nanostructures is between 0.14 and 50. The aspect ratio as used herein refers to the height of the nanostructures, such as from the base to the tip, divided by the width of the nanostructures, such as base width of the nanostructures. The nanostructures may thereby be high aspect ratio nanostructures. In a further embodiment of the present disclosure, the tip of the nanostructures has a curvature, said curvature may be described by a tip width. It may be a preference that the tip width is below 350 nm, for example between 10 nm and 350 nm, preferably the tip width is below 350 nm, more preferably below 100 nm, yet more preferably below 50 nm, yet even more preferably below 30 nm, even yet more preferably below 20 nm, once more even yet more preferably below 10 nm, most preferably below 7 nm. A surface comprising nanostructure with a lower tip width is typically capable of inducing a larger stress on a bacteria, thereby leading to higher antibacterial properties. The above-mentioned tip widths is a result of the presently disclosed method. In a further embodiment of the present disclosure, the tip width of the nanostructure is below 0.5 μm, more preferably below 300 nm, yet more preferably below 200 nm, even yet more preferably below 100 nm, most preferably below 50 nm. In many instances of the presently disclosed embodiment the tip width is identical to the tip width. Thereby, it may be a preference that the tip width is below the size of the bacteria related to peri-implantitis. The nanostructures may be substantially vertical, i.e. perpendicular to the surface, alternatively, the nanostructures may, on average, have a sidewall angle below 90°. In an embodiment of the present disclosure, the sidewall angle is between 18° and 90°. The nanostructures may thereby be substantially cone-shaped, such as extending from the surface of the implantable device.

DETAILED DESCRIPTION OF THE DRAWINGS

The invention will in the following be described in greater detail with reference to the accompanying drawings. The drawings are exemplary and are intended to illustrate some of the features of the presently disclosed method for formation of monolithic nanostructures on prosthetic devices, and prosthetic devices comprising a surface with monolithic nanostructures, and are not to be construed as limiting to the presently disclosed invention.

FIG. 1 shows an outline of a method for formation of monolithic nanostructures (9), wherein the nanostructures are formed by a method comprising deposition (2) of a metal film (3) on the surface of an implantable device (1), and the subsequent transformation of said metal film into an etch mask comprising nanoparticles (5) an etch mask by heating (4). The surface may subsequently be etched (6) by any isotropic and/or anisotropic etching method, such as a dry etching or a wet etching process. The figure exemplifies a typical substantially anisotropic etching, wherein pillar or cone-shaped nanostructures may be formed. It can be seen that the nanoparticles are, to an extent, also affected by the etching step, and may as a consequence result, in combination with the isotropic directional etching, formation of cone-shaped nanostructures. The method may further comprise removal of the etch mask (8), thereby forming monolithic nanostructures (9) on the surface of the implantable device. Removal of the etch mask may comprise immersing said surface in a suitable solution for removal of the nanoparticles from the nanostructures, such as an aqua regia solution. The method is highly versatile in that multiple properties of the final nanostructures can be tuned by for example the thickness of the metal film, the material of the metal film, the heating conditions, the etching solution, and the etching time. Thereby, monolithic nanostructures with desired properties can be formed, such as monolithic nanostructures for osseointegration and bacterial prevention.

In specific embodiments of the present disclosure, the method may be used to realize a surface of an implantable device comprising microstructures and nanostructures for increased osseointegration and antibacterial properties. For example, the method may be repeated to form structures having different properties. In a specific example, the surface of the implant is initially processed according to the present disclosed method to achieve microstructures, in a second step, the method is repeated at modified processing parameter, in order to form nanostructures, thereby realizing an implantable device comprising microstructures and nanostructures for increased osseointegration and antibacterial properties. Alternatively the microstructures may be formed, prior to forming nanostructures using the presently disclosed method, according to methods known to a skilled person, for example in Jemat et al. Biomed Res Int. 2015; 2015: 791725. For example grit blasting or acid etching are methods commonly used in today's dental implant to make microstructures on surfaces for better osseointegration. These known methods may be utilized to form microstructures before formation of nanostructures as disclosed elsewhere herein. The surface of the implantable device may there comprise microstructures, such as formed by grit blasting and/or acid etching or any other method known to the skilled person for formation of microstructures on surfaces of an implantable device (e.g. a dental implant).

FIG. 5 shows exemplary conical monolithic nanostructures produced by chemical wet etching using a mixture of HF, $H_2O_2$ and $H_2O$ according to an embodiment of the present disclosure. FIG. 5A shows nanostructures with a higher aspect ratio. The tip width is on average approximately 5 nm, the base width is on average between about 15-25 nm, and the height is between about 50-75 nm. The aspect ratio is thereby between about 2-5. FIGS. 5B-5D show examples of nanostructures with a lower aspect ratio. The tip widths are about between 3-5 nm, the base widths are between about 40-65 nm, and the heights are between about 40-60 nm. Consequently, the aspect ratio of these nanostructures is approximately 1.

Figure 6:
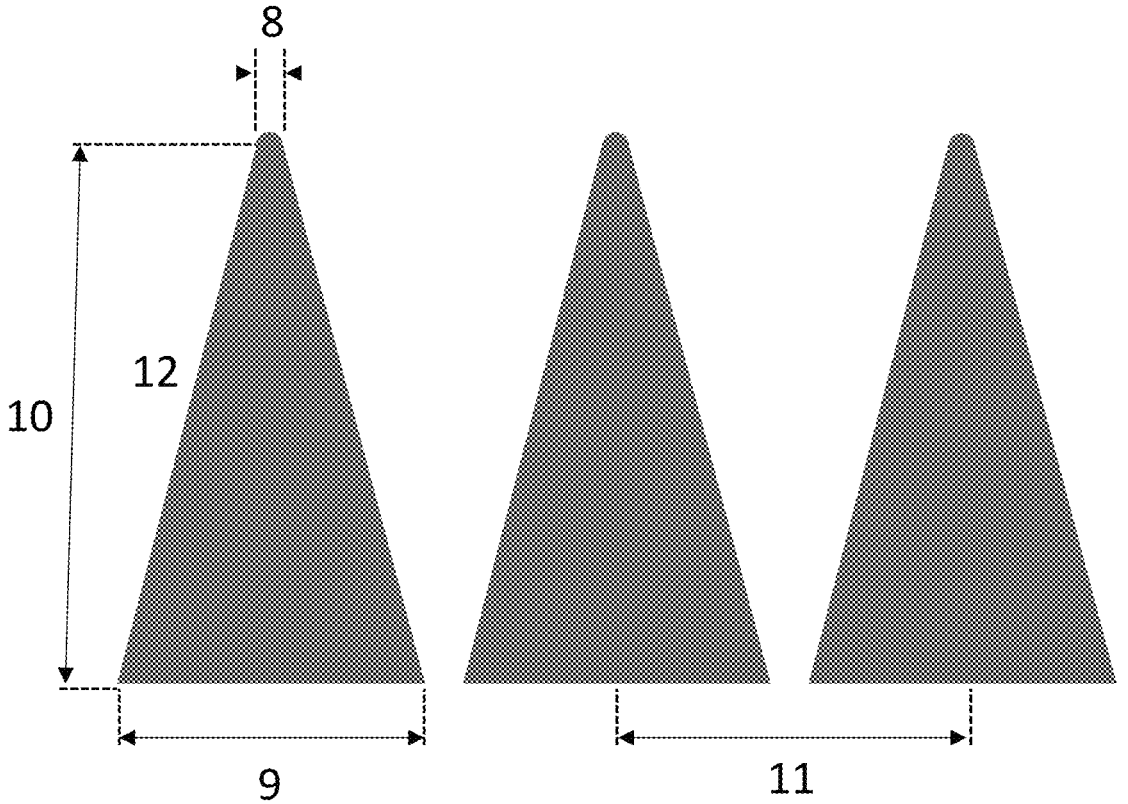
FIG. 6 shows a schematic illustration of monolithic nanostructures, according to embodiment of the present disclosure.

FIG. 6 shows a schematic illustration of monolithic nanostructures having a conical shape. As can be seen the conical shape is defined by an tip width (8), a base width (9), a height (10), a distance between two neighboring nanostructures (11, i.e. the distance between the tips of two neighboring nanostructures), and the sidewall angle being defined by the angle between the sidewall and a plane perpendicular to the nanostructure (e.g. the bottom plane of the nanostructure) and may be obtained by arctangent of the result of the height of the nanostructure divided by half the base width. Similarly, the aspect ratio of the nanostructure is typically defined as the height of the nanostructure divided by the base width. The tip width may thereby be seen as a parameter defining the sharpness of the tip, with the tip width being defined as the width of the tip of the nanostructure.

FIG. 6 shows a schematic illustration of etching of a target surface (78), e.g. a surface of an implantable device, according to an embodiment of the present disclosure. As can be seen, at least a part of said surface has been covered by a mask (77). The structures formed by the etching of the implantable device depend on the etch rate of the mask and on the etch rate of the target. In general, an etching process that has a low etch rate of the mask material with respect to the etch rate of the target material typically leads to a process as shown in 71-73. Here, it can be seen that the mask material is almost intact while the target material is etched to form deep trenches. The resulting nanostructures may be more pillar-shaped than cone-shaped with vertical or almost vertical side walls. Contrary to this, 74-75 shows a process wherein the mask (e.g. nanoparticles) are etched to a significant degree compared to the target material. As can be seen the mask material is etched away (here shown as isotropic etching wherein the mask, e.g. nanoparticles, become thinner and narrower). The smaller mask material leads to exposing a larger part of the target surface, e.g. the surface of the implantable device, such that nanostructures with angled sidewalls are formed. As can be understood, the resulting sidewall angle is dependent on the relative etch rate between the mask material and the target material, and in particular the rate at which the nanoparticles is decreased in size (i.e. the etching of the nanoparticles in the plane of the target material, e.g. the surface of the implantable device. The faster the mask material is etched away, in the horizontal direction (i.e. in the plane of the mask), the lower the sidewall angle. Therefore, the etch process is advantageously configured such that the rate of horizontal etching of the mask material is selected based on the rate of vertical etching of the target material (i.e. the relative rate/ratio between the vertical etching of the target material and the horizontal etching of the mask material) for producing the nanostructures with the desired sidewall angle, and other properties of the nanostructure, such as the height of the nanostructures according to the process outlined above.

Examples of the presently disclosed embodiment.

Example 1: Fabrication of Monolithic Nanostructures on Titanium Samples by Wet Etching and Dry Etching Material and Method Thin Metal Film Deposition Thin metal films of Au (gold) with a thickness of around 5 nm were deposited on multiple titanium samples, by using atomic layer deposition, with a deposition rate of 1 Å/s.

Rapid Thermal Annealing

The titanium samples were thermally annealed for 3 minutes at 650° C. in vacuum condition. Afterwards, gold nanoparticles were formed on the surface of the titanium sample and used as a mask pattern in the subsequent etching process.

Dry Etching or Wet Etching a. Dry etching

The samples designated for dry etching were etched by inductively coupled plasma reactive ion etching (ICP-RIE) with a gas source mixture of $CF_4/SF_6$.

b. Wet etching c. The samples designated for wet etching were etched by immersion in a hydrofluoric acid (HF) based solution. The samples were rinsed clean after the wet etching process.

Removal of Residual Mask Material

Following etching, the mask material was removed by immersion in an aqua regia solution (a mixture of nitric acid and hydrochloric acid).

Results

The formed Au nanoparticles (after step 2), and the formed monolithic nanostructures without the etch mask (after step 4), were characterized by scanning electron microscopy.

Depending on the thickness of the formed metal film, the size of the nanoparticles could be tuned, from relatively small (FIG. 2A) to relatively large nanoparticles (FIG. 2C). The nanoparticles shown in FIG. 2B had an average size (fitted diameter) of 42.2 nm and the density was around 200/$\mu m^2$.

Furthermore, the scanning electron micrographs of the monolithic nanostructures revealed cone-shaped nanostructures, positioned in a substantially random pattern on the surface of the sample, FIG. 3. The average tip width was less than 10 nm while the diameter at the base of the nanostructures was on average around 80 nm. Simultaneously the average height of the nanostructures was around 150 nm.

Figure 4B:
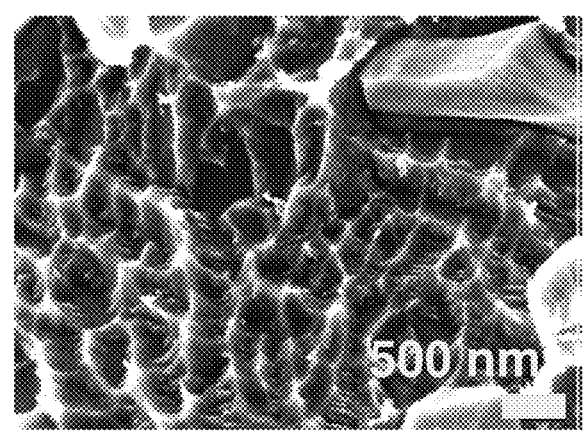

The wet etched nanostructures had a ridge-shaped structure, as shown in FIGS. 4A and 4B. The ridge was, in FIG. 4A, formed between substantially concave indentations of the surface of the titanium samples. The isotropic nature of the wet etching process resulted in a size-variation of the indentations, and subsequently, the wet etched nanostructures.

Example 2: Fabrication and Characterization of Monolithic Nanostructures by Wet Etching and Dry Etching

Material and Method

Thin Metal Film Deposition

A thin metal film of Au (gold) with a thickness of 5 nm is deposited on Titanium samples by using e-beam deposition with a deposition rate of 1 Å/s.

Rapid Thermal Annealing

The Titanium samples are thermally annealed for 3 minutes at 650° C. in the condition of vacuum. The resulting nanoparticles, formed on the surface of the target substrate, are shown in FIG. 2D.

Dry Etching or Wet Etching a. Dry Etching

Half of the titanium samples were dry etched, and the other half wet etched. The dry etched samples were dry etched by the use of an ICP-RIE machine under the following conditions: $Cl_2$: 30 sccm, Ar: 2 sccm, Pressure: 3 mTorr, coil power: 400 W, plate power: 100 W, Temp.: 20° C., etched for 90 seconds.

The resulting dry-etched nanostructures are shown in FIG. 3.

b. Wet Etching

A part of the samples were immersed in Buffered hydrofluoric acid (BHF) solution for 6 minutes, then rinsed by DI water for 5 minutes and dried by $N_2$ gun. The etched nanostructures are shown in FIG. 4A.

Figure 5A:
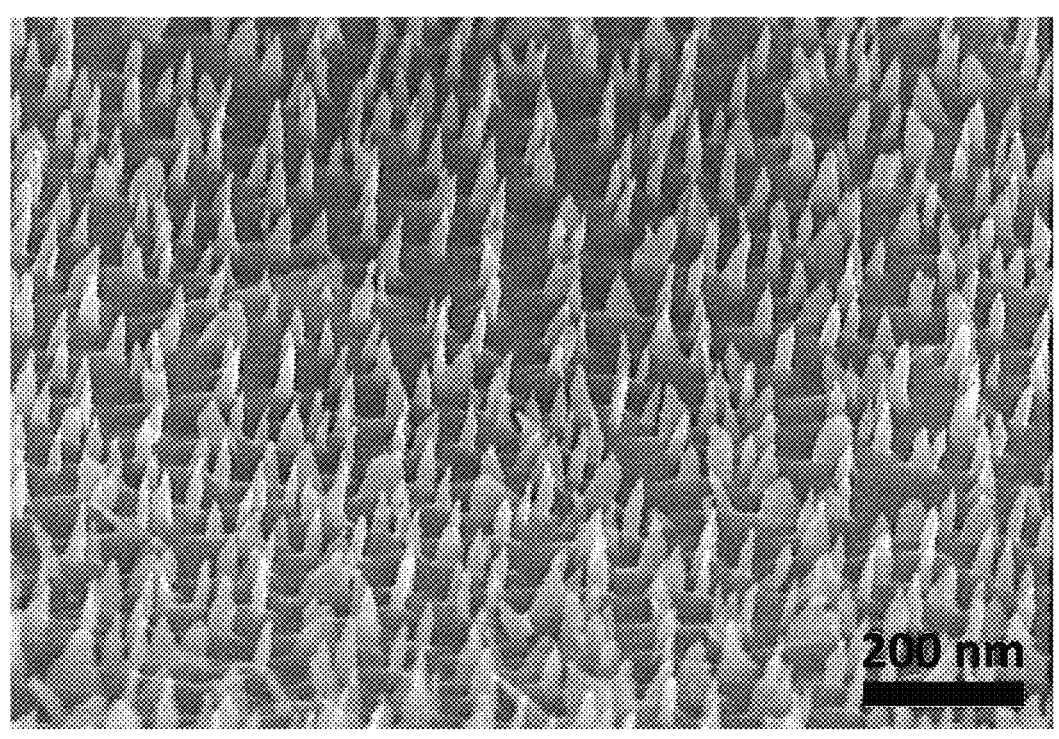
FIG. 5 shows exemplary conical monolithic nanostructures produced according to an embodiment of the present disclosure.
Figure 5B:
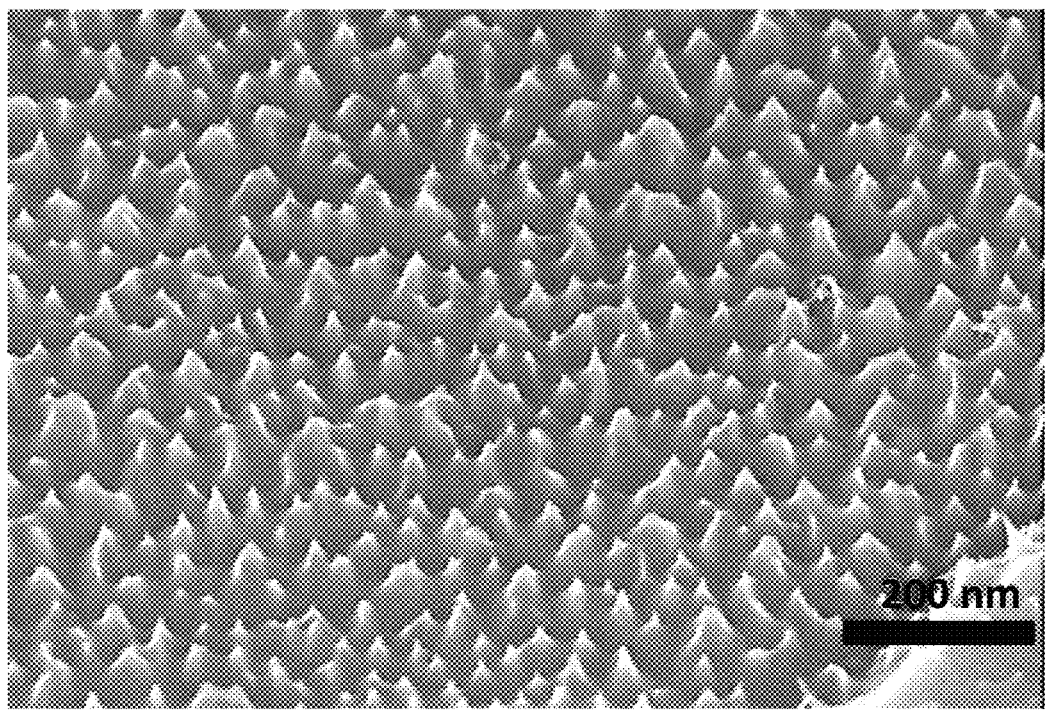

Another part of the samples were immersed in a solution of $HF:H_2O_2:H_2O$ (2:1:10) for 4 minutes, then rinsed by DI water for 5 minutes and dried by $N_2$ gun. The etched nanostructures are shown in FIG. 5A.

Figure 5C:
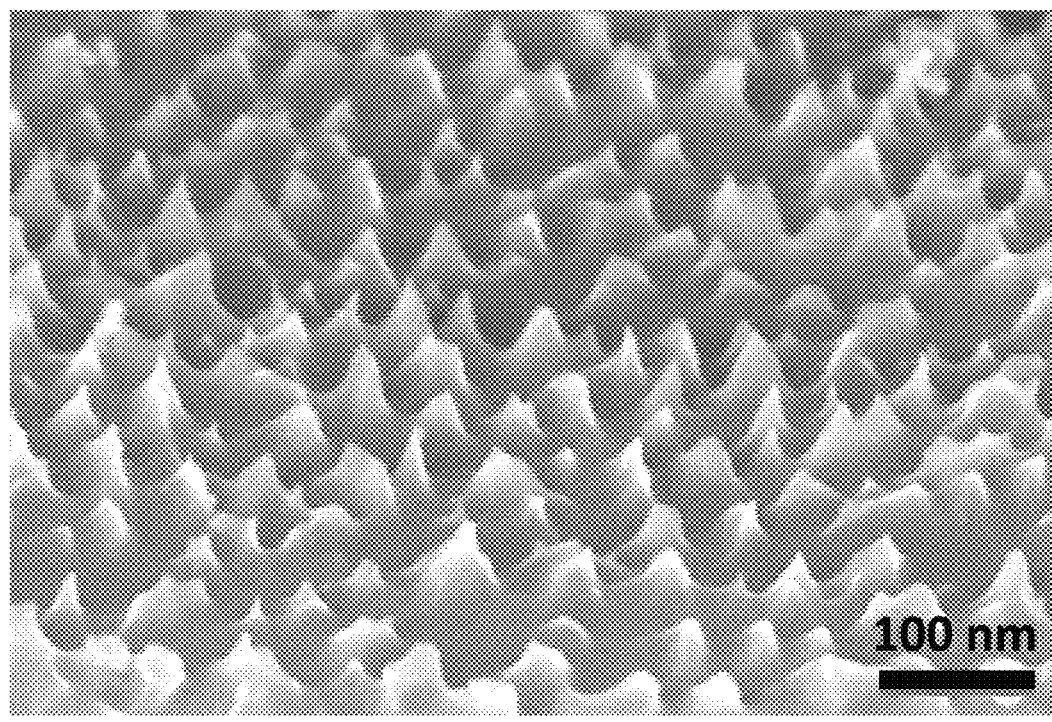
Figure 5D:
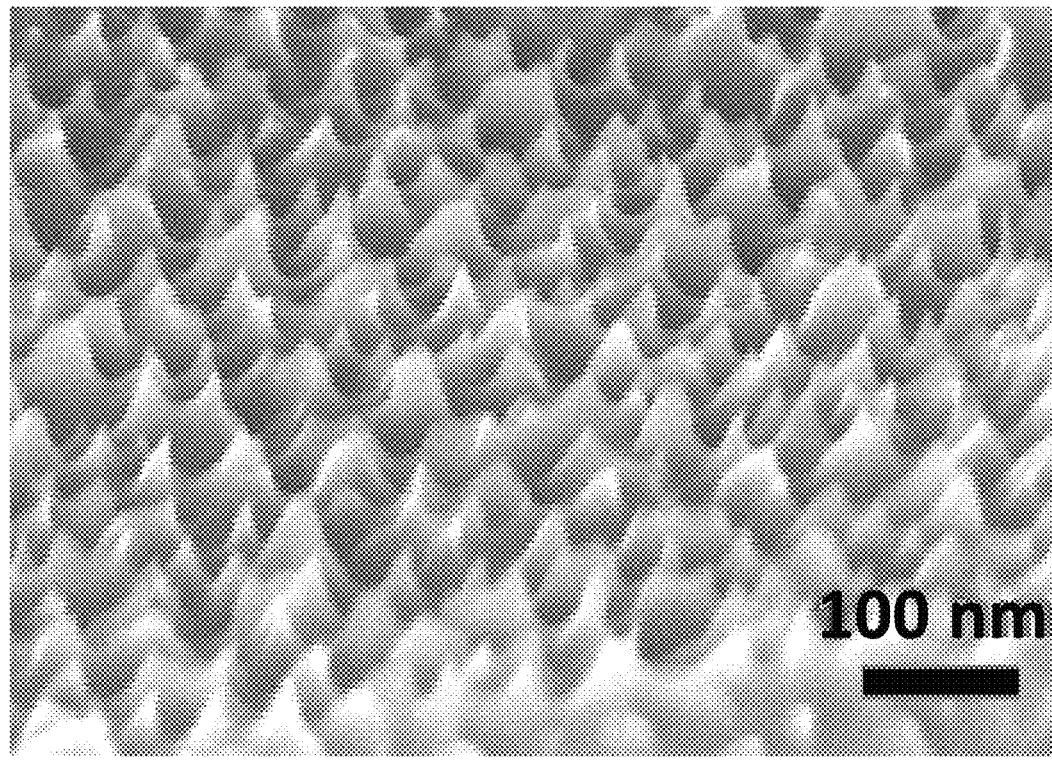

Yet another part of the samples were immersed in a solution of $HF:H_2O_2:H_2O$ (2:1:10) for 3 minutes, then rinsed by DI water for 5 minutes and dried by $N_2$ gun. The etched nanostructures are shown in FIG. 5C.

Removal of Residual Mask Material

The residual mask material of each sample was removed by an aqua regia solution ($HCl:HNO_3$ with a ratio of 3:1).

The samples were immersed in said aqua regia solution for 3 minutes, then rinsed by DI water for 5 minutes and dried by $N_2$ gun.

Characterization and Result

The formed Au nanoparticles, produced in step 2, were characterized using Scanning Electron Microscope (SEM). The measured average size (diameter) of the nanoparticles were 42.2 nm and the nanoparticle density was 200/$\mu m^2$. The size and density of nanoparticles were identified to be dependent on the thickness of the metal film deposited in step 1. A thicker metal film leads to a larger nanoparticle size and a lower structure density. Exemplary SEM images of formed Au nanoparticles are shown in FIG. 2A-D, and further quantified in the table below.

| Deposited Au film thickness (nm) | Mean size of formed Au nanoparticles (nm) | Standard deviation (nm) |
|---|---|---|
| 3 | 16 | 6 |
| 5 | 43 | 18 |
| 7 | 63 | 29 |
| 9 | 126 | 47 |
| 11 | 231 | 64 |
| 13 | 316 | 138 |

Example 3: In Vitro Bacterial Experiment

Purpose and Principle

The objective of this study is to demonstrate if there is an antimicrobial effect of Titanium samples with surface nanostructures. Titanium sample with a plain surface is included in the test as a reference sample.

The concept is to introduce a biofilm on the test units and then compare the microbial count on the treated test units to the reference units.

Test units with and without nanostructures are inoculated with a bacterial suspension. The samples comprising nanostructures had been processed according to example 2 with wet etching by Buffered hydrofluoric acid (BHF), shown in FIG. 4A. The content of microorganisms was measured after storage of the test units in inoculum at room temperature for 4 days. The test units were rinsed with sterile water and the remaining microorganisms eluted in MRD. Concentration of bacteria in MRD was measured and finally the test units were swabbed and the content of bacteria on the swabs were measured.

Procedure 2.1 Samples

Titanium test units had a surface area of 1×1 cm. As mentioned, the test units comprising nanostructures had been processed according to example 2 with wet etching by Buffered hydrofluoric acid (BHF), and are shown in FIG. 4A.

2.2 Inoculum

Test organism is *Staphylococcus aureus* ATCC 29523. Inoculation level was targeted around $10^8$ CFU per mL inoculum.

The test organism was prepared according to standard procedure, including an enrichment step and a control for purity and concentration.

2.3 Equipment

Polycarbonate tubes 99×Ø16 mm with screw cap, sterile
TS/5-42 dry swabs with polyester tip, 10 mL neutralizing
buffer Sterile water Maximum Recovery Diluent (MRD)

Microbiological growth media: Blood agar

Incubator at 37° C.

2.4 Methods and Media

Analysis of total microbial count at blood agar, spread
plate technique, incubation at 37° C. for 1 day and counting
all microorganisms.

a. Preparation, Inoculation of the Test Units and Analysis

Test units are placed in 1 mL inoculum in the tube and
stored at ambient temperature in a LAF bench for 4 days.
The content of microorganisms in the inoculum is analysed.

The test units are taken up from the inoculum by sterile
forceps and rinsed with 10 mL of sterile water to remove
excessive inoculum. Afterwards placed in 9 mL sterile MRD
and microorganisms eluted by whirling for 3×3 sec with
rotation speed at 500 rpm. The contents of microorganisms
in the MRD are analysed.

The test units are by sterile forceps transferred from the
MRD rinse to sterile petri dishes. The test unit is swabbed
thoroughly on both sides and the content of microorganisms
on the swabs are analysed.

Results

Figure 8:
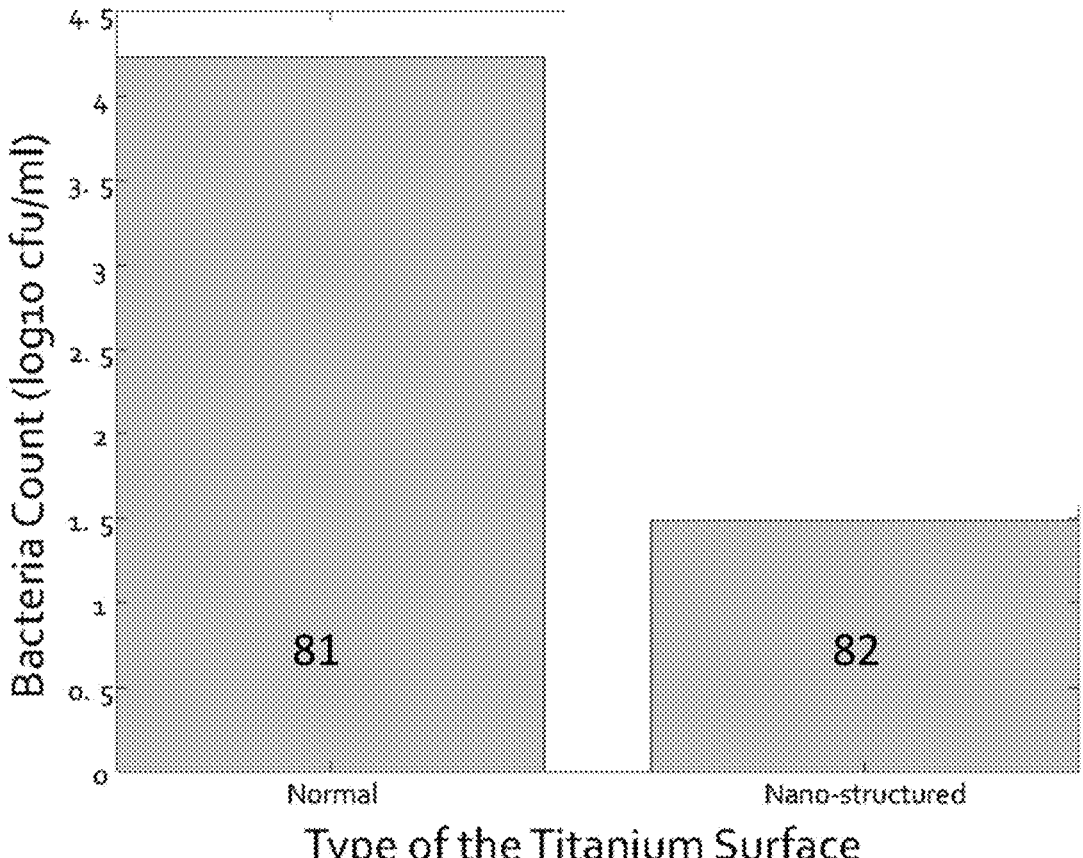
FIG. 8 shows the antibacterial properties of a surface processed according to an embodiment of the present disclosure.

As shown in FIG. 8, the Ti sample with nanostructured
surface (82) showed a significant reduction of bacterial
counts ($1.5 \log_{10}$ CFU/ml) compared with Ti samples with
plain surface (81) ($4.3 \log_{10}$ CFU/ml).

CONCLUSION

The in vitro bacterial test result indicates that Ti with
surface nanostructure has an efficient antimicrobial perfor-
mance compared with Ti with plain surface.

Items

1. A method for formation of monolithic nanostructures
on an implantable device, the method comprising:
   a. depositing a metal film to a surface of the implant-
   able device;
   b. heating the metal film for a period of time, such that
   the metal film transforms into multiple discrete nan-
   oparticles, the multiple nanoparticles thereby form-
   ing an etch mask on said surface of the implantable
   device;
   c. etching the implantable device such that said surface
   of the implantable device is etched through the etch
   mask, thereby forming monolithic nanostructures in
   said surface of the implantable device; and
   d. (optionally) removing the etch mask.
2. The method for formation of monolithic nanostructures
according to item 1, wherein the etching step is con-
figured such that both the surface of the implantable
device and the nanoparticles are etched, such as con-
figured for forming cone-shaped nanostructures.
3. The method for formation of monolithic nanostructures
according to any one of the preceding items, wherein
the material of the implantable device is titanium, such
as grade 4 or grade 5 titanium, titanium alloy, zirco-
nium, or polyethylene, such as ultra-high molecular-
weight polyethylene (UHMWPE) or cross-linked poly-
ethylene (XLPE).
4. The method for formation of monolithic nanostructures
according to any one of the preceding items, wherein the implantable device is a dental implant for providing
support and stability to a dental prosthesis.
5. The method for formation of monolithic nanostructures
according to any one of the preceding items, wherein
the implantable device is a hip prosthesis, a knee
prosthesis, a trauma nail, a knee implant, a lag screw,
a spinal cage, a glenoid implant, an ankle fusion
implant, a foot/toe implant, a long bone osteotomy
plate or bone implant, a sacroiliac joint implant, a
cranial plate, or a maxillofacial plate.
6. The method for formation of monolithic nanostructures
according to any one of the preceding items, wherein
the nanostructures are configured for improved osse-
ointegration and bacterial growth prevention of the
implantable device.
7. The method for formation of monolithic nanostructures
according to any one of the preceding items, wherein
the material of the metal film is selected from the group
of: gold, silver, aluminum, nickel, or a combination
thereof.
8. The method for formation of monolithic nanostructures
according to any one of the preceding items, wherein
the thickness of the metal film is between 1 nm and 25
nm.
9. The method for formation of monolithic nanostructures
according to any one of the preceding items, wherein
the metal film is deposited by thin film deposition, such
as atomic layer deposition, e-beam deposition, or sput-
tering.
10. The method for formation of monolithic nanostruc-
tures according to any one of the preceding items,
wherein the heating step comprises or consists of rapid
thermal annealing of the metal film.
11. The method for formation of monolithic nanostruc-
tures according to any one of the preceding items,
wherein the metal film is heated for at least 1 minute.
12. The method for formation of monolithic nanostruc-
tures according to any one of the preceding items,
wherein the metal film is heated to a temperature
between 70° C. and 900° C.
13. The method for formation of monolithic nanostruc-
tures according to any one of the preceding items,
wherein the heating step is performed in an inert
atmosphere, such as a nitrogen atmosphere.
14. The method for formation of monolithic nanostruc-
tures according to any one of the preceding items,
wherein the heating step is performed below atmo-
spheric pressure, such as vacuum conditions.
15. The method for formation of monolithic nanostruc-
tures according to any one of the preceding items,
wherein the average density of the nanoparticles is
between 1 $\mu m^{-2}$ and 2000 $\mu m^{-2}$.
16. The method for formation of monolithic nanostruc-
tures according to any one of the preceding items,
wherein the average size, such as diameter, of the
nanoparticles is between 10 nm and 350 nm.
17. The method for formation of monolithic nanostruc-
tures according to any one of the preceding items,
wherein the coefficient of variation of the nanopar-
ticles, such as of the size, is below 50%.
18. The method for formation of monolithic nanostruc-
tures according to any one of the preceding items,
wherein etching is performed by wet etching, such as
by an etching solution.
19. The method for formation of monolithic nanostruc-
tures according to item 18, wherein the etching solution is a hydrofluoric acid (HF) solution, a hydrogen peroxide ($H_2O_2$) solution, or a mixture thereof.

20. The method for formation of monolithic nanostructures according to any one of the preceding items, wherein etching is performed by dry etching, such as reactive ion etching (RIE), inductively coupled plasma reactive ion etching (ICP-RIE) and/or ion beam etching (IBE).

21. The method for formation of monolithic nanostructures according to any one of the preceding items, wherein etching is performed with a source gas consisting of $Cl_2$, Ar, $CF_4/SF_6$, and $O_2$ or a mixture thereof.

22. The method for formation of monolithic nanostructures according to any one of the preceding items, wherein the etch mask is removed by immersion in a solution, such as an aqua regia solution.

23. The method for formation of monolithic nanostructures according to any one of the preceding items, wherein the density of the nanostructures is between 1 $\mu m^{-2}$ and 2000 $\mu m^{-2}$.

24. The method for formation of monolithic nanostructures according to any one of the preceding items, wherein the average height of the nanostructures is between 50 nm and 500 nm.

25. The method for formation of monolithic nanostructures according to any one of the preceding items, wherein the average spacing between the nanostructures is between 10 nm and 300 nm.

26. The method for formation of monolithic nanostructures according to any one of the preceding items, wherein the aspect ratio of the nanostructures is between 0.14 and 50.

27. The method for formation of monolithic nanostructures according to any one of the preceding items, wherein the tip width of the nanostructures is between 10 nm and 350 nm.

28. The method for formation of monolithic nanostructures according to any one of the preceding items, wherein the tip width of the nanostructures is below 0.5 $\mu m$, more preferably below 100 nm, yet more preferably below 50 nm, even yet more preferably below 20 nm, once yet more preferably below 10 nm, even yet more preferably below 8 nm.

29. The method for formation of monolithic nanostructures according to any one of the preceding items, wherein the sidewall angle of the nanostructures is between 18° and 90°.

30. The method for formation of monolithic nanostructures according to any one of the preceding items, wherein the nanostructures are substantially cone-shaped, extending from the surface of the implantable device.

31. The method for formation of monolithic nanostructures according to any one of the preceding items, wherein the nanostructures are provided as a number of ridges, formed between substantially concave indentations of the surface of the implantable device.

32. An implantable device comprising a surface with monolithic nanostructures for osseointegration and bacterial film prevention, formed by any one of the preceding items.

33. An implantable device comprising a surface with monolithic nanostructures for osseointegration and bacterial film prevention, wherein the nanostructures are:

a. substantially cone-shaped, extending from the surface of the implantable device; or b. substantially ridge-shaped, formed between a number of substantially concave indentations of the surface.

34. The implantable device of item 33, wherein the density of the monolithic nanostructures is between 1 $\mu m^{-1}$ and 2000 $\mu m^{-1}$.

35. The implantable device according to any one of items 33-34, wherein the average height of the nanostructures is between 30 nm and 500 nm, such as between 50 nm and 500 nm.

36. The implantable device according to any one of items 33-35, wherein the concave indentations are substantially hemispherical.

37. The implantable device according to any one of items 33-36, wherein the concave indentations have an average radius of between 50 nm and 500 nm.

38. The implantable device according to any one of items 33-37, wherein the average spacing between the nanostructures is between 10 and 300 nm.

39. The implantable device according to any one of items 33-38, wherein the aspect ratio of the nanostructures is between 0.14 and 50.

40. The implantable device according to any one of items 33-39, wherein the tip width of the nanostructures is between 10 nm and 350 nm.

41. The implantable device according to any one of items 33-40, wherein the tip width of the nanostructure is below 0.5 $\mu m$.

42. The implantable device according to any of items 33-41, wherein the sidewall angle of the nanostructures is between 18° and 90°.

The invention claimed is:

1. A method for formation of monolithic nanostructures on an implantable device, the monolithic nanostructures being configured for osseointegration and prevention of bacterial growth of the implantable device, the method comprising:

a. depositing a metal film to a surface of the implantable device;

b. heating the metal film for a period of time, such that the metal film transforms into multiple discrete nanoparticles, the multiple nanoparticles thereby forming an etch mask on said surface of the implantable device; and c. etching the implantable device such that said surface of the implantable device is etched through the etch mask, wherein the surface of the implantable device is etched simultaneously as the etch mask is etched, thereby forming monolithic nanostructures on the surface of the implantable device.

2. The method for formation of monolithic nanostructures according to claim 1, wherein, in the etching step, the surface of the implantable device is etched simultaneously as the nanoparticles of the etch mask are etched.

3. The method for formation of monolithic nanostructures according to claim 1, wherein the implantable device is etched at an etch rate of between 0.01-1 times the etch rate of the etch mask.

4. The method for formation of monolithic nanostructures according to claim 1, wherein the metal film is heated for at least 1 minute to a temperature between 70° C. and 900° C.

5. The method for formation of monolithic nanostructures according to claim 1, wherein the average diameter of the nanoparticles is between 10 nm and 350 nm.

6. The method for formation of monolithic nanostructures according to claim 1, wherein etching is performed by wet etching.

7. The method for formation of monolithic nanostructures according to claim 1, wherein etching is performed by dry etching.

8. The method for formation of monolithic nanostructures according to claim 1, wherein the density of the nanostructures is between 1 $\mu m^{-2}$ and 2000 $\mu m^{-2}$.

9. The method for formation of monolithic nanostructures according to claim 1, wherein the average height of the nanostructures is between 10 nm and 500 nm.

10. The method for formation of monolithic nanostructures according to claim 1, wherein the nanostructures have an average spacing of between 10 nm and 300 nm.

11. The method for formation of monolithic nanostructures according to claim 1, wherein the nanostructures have a tip width of below 0.5 $\mu m$.

12. The method for formation of monolithic nanostructures according to claim 1, wherein the nanostructures have a sidewall angle of between 45° and 90°.

13. The method for formation of monolithic nanostructures according to claim 1, wherein the nanostructures are substantially cone-shaped, extending from the surface of the implantable device.

14. The method for formation of monolithic nanostructures according to claim 1, wherein the nanostructures are provided as a number of ridges, formed between substantially concave indentations of the surface of the implantable device.

15. A method for formation of monolithic nanostructures on an implantable device, the method comprising:

a. depositing a metal film to a surface of the implantable device;

b. heating the metal film for a period of time, such that the metal film transforms into multiple discrete nanoparticles, the multiple nanoparticles thereby forming an etch mask on said surface of the implantable device; and c. etching the implantable device such that said surface of the implantable device is etched through the etch mask, wherein the surface of the implantable device is etched simultaneously as the etch mask is etched, thereby forming monolithic nanostructures on the surface of the implantable device, wherein the nanostructures are substantially cone-shaped, extending from the surface of the implantable device.

\*    \*    \*    \*    \*